US012617700B2

(12) United States Patent
Rosenblatt et al.

(10) Patent No.: US 12,617,700 B2
(45) Date of Patent: *May 5, 2026

(54) METHODS FOR ERADICATING BIOFILMS FROM PLUMBING SYSTEMS

(71) Applicant: GORDON & ROSENBLATT, LLC, New York, NY (US)

(72) Inventors: Aaron Rosenblatt, New York, NY (US); Gilbert Gordon, Oxford, OH (US)

(73) Assignee: GORDON & ROSENBLATT, LLC, New York, NY (US)

( * ) Notice: Subject to any disclaimer, the term of this patent is extended or adjusted under 35 U.S.C. 154(b) by 353 days.

This patent is subject to a terminal disclaimer.

(21) Appl. No.: 18/298,334

(22) Filed: Apr. 10, 2023

(65) Prior Publication Data

US 2024/0034649 A1    Feb. 1, 2024

Related U.S. Application Data

(63) Continuation of application No. 16/875,943, filed on May 15, 2020, now Pat. No. 11,655,167, which is a continuation of application No. 15/014,951, filed on Feb. 3, 2016, now Pat. No. 10,696,572, which is a continuation-in-part of application No. PCT/US2015/043331, filed on Jul. 31, 2015.

(60) Provisional application No. 62/032,143, filed on Aug. 1, 2014.

(51) Int. Cl.
| | |
|---|---|
| *C02F 1/50* | (2023.01) |
| *A01N 59/00* | (2006.01) |
| *C02F 1/76* | (2023.01) |

(52) U.S. Cl.
CPC ............... *C02F 1/50* (2013.01); *A01N 59/00* (2013.01); *C02F 1/76* (2013.01); *C02F 2303/04* (2013.01); *C02F 2305/023* (2013.01)

(58) Field of Classification Search
CPC .......... C02F 1/50; C02F 1/76; C02F 2303/04; C02F 2305/023; C02F 2307/14; A01N 59/00; Y02A 50/30
See application file for complete search history.

(56) References Cited

U.S. PATENT DOCUMENTS

| | | | | |
|---|---|---|---|---|
| 4,929,365 A | * | 5/1990 | Clark | ...................... A01N 59/00 |
| | | | | 210/764 |
| 5,164,043 A | * | 11/1992 | Griggs | ................... D21C 9/153 |
| | | | | 162/57 |

| | | | | |
|---|---|---|---|---|
| 5,211,811 A | * | 5/1993 | Griggs | ................... D21C 9/147 |
| | | | | 162/65 |
| 5,526,841 A | * | 6/1996 | Detsch | .................. B08B 9/0327 |
| | | | | 137/15.04 |
| 6,019,117 A | * | 2/2000 | Detsch | ................. A61C 1/0076 |
| | | | | 134/169 C |
| 6,464,868 B1 | * | 10/2002 | Korin | ........................ C02F 1/78 |
| | | | | 210/205 |
| 6,599,432 B2 | * | 7/2003 | Kross | ................... A61C 1/0076 |
| | | | | 424/661 |
| 6,605,308 B2 | * | 8/2003 | Shane | ................... A61L 2/0088 |
| | | | | 452/131 |
| 6,716,354 B2 | * | 4/2004 | Rosenblatt | ................ C02F 1/76 |
| | | | | 210/764 |
| 6,767,470 B2 | * | 7/2004 | Iverson | ..................... C02F 1/50 |
| 7,449,119 B2 | * | 11/2008 | Brown | .................... C02F 1/766 |
| | | | | 210/756 |
| 7,601,266 B2 | * | 10/2009 | Iverson | ..................... C02F 5/14 |
| | | | | 210/764 |
| 9,630,841 B2 | * | 4/2017 | Uhlmann | .................. C02F 1/76 |
| 2005/0035040 A1 | * | 2/2005 | Knapp | .................... C02F 1/003 |
| | | | | 210/206 |
| 2005/0150520 A1 | * | 7/2005 | Gill | ........................ C11D 7/265 |
| | | | | 134/22.12 |
| 2006/0197058 A1 | * | 9/2006 | Martin | ...................... C02F 1/76 |
| | | | | 252/188.1 |
| 2007/0081573 A1 | * | 4/2007 | Beardwood | ............... C02F 1/76 |
| | | | | 261/DIG. 11 |
| 2007/0257127 A1 | * | 11/2007 | Iverson | .................... C02F 1/78 |
| | | | | 239/10 |
| 2008/0113040 A1 | * | 5/2008 | Doona | ................. C11D 3/3956 |
| | | | | 424/661 |
| 2009/0101593 A1 | * | 4/2009 | Dresty | ..................... C02F 1/76 |
| | | | | 210/695 |
| 2012/0148477 A1 | * | 6/2012 | Rosenblatt | ........... C01B 11/028 |
| | | | | 423/477 |
| 2012/0207858 A1 | * | 8/2012 | Martin | ................ C11D 3/3955 |
| | | | | 252/186.1 |

FOREIGN PATENT DOCUMENTS

| | | | | |
|---|---|---|---|---|
| WO | WO-2012084247 A1 | * | 6/2012 | ............... C02F 1/76 |

* cited by examiner

*Primary Examiner* — Regina M Yoo
(74) *Attorney, Agent, or Firm* — FisherBroyles, LLP; Adam K. Whiting

(57) ABSTRACT

Disclosed are advantageous systems and methods for treating building water systems, especially the interior surfaces of premise plumbing, to remove biofilm and inactivate biofilm-associated pathogens, including protozoa, using disinfectant formulations at concentrations at in excess of those used for drinking water treatment, and further, in co-applying complexing agents to mitigate corrosion of the materials treated; and using these in conjunction with off-gas containment devices that allow flushing of taps without the liberation of toxic fumes.

17 Claims, 2 Drawing Sheets

TAP

DRAIN

METHODS FOR ERADICATING BIOFILMS FROM PLUMBING SYSTEMS

CROSS REFERENCE TO RELATED APPLICATIONS

This application is a continuation of U.S. patent application Ser. No. 16/875,943, filed May 15, 2020, which is a continuation of U.S. patent application Ser. No. 15/014,951, filed Feb. 3, 2016, issued as U.S. Pat. No. 10,696,572 B2 on Jun. 30, 2020, which claims priority as a continuation-in-part of International Patent Application PCT/US2015/043331, filed Jul. 31, 2015, which claims priority to U.S. Provisional Patent Application No. 62/032,143, filed Aug. 1, 2014, each of which is entirely incorporated herein by reference for all purposes.

FIELD

The present disclosure relates to methods for treating plumbing systems to eradicate, remove and/or disinfect biofilms and biofilm-associated pathogens using treatment solutions comprising a mixture chlorine and chlorine dioxide.

BACKGROUND

Plumbing associated infections cause tens of thousands of illnesses and deaths every year. Clinically significant plumbing-associated pathogens include Gram-negative environmental bacteria and free-living amoeba (FLA) that can enter plumbing systems in relatively small numbers, reproduce (amplify) to large numbers and release as respirable bioaerosols from the plumbing into the environment. The only plumbing-associated disease requiring notification in the United States is Legionnaires' disease, a severe pneumonic infection caused by the bacterium *Legionella*. Premise plumbing systems are now recognized as the primary source of Legionnaires' disease. (Yoder et al., 2008) The US Centers for Disease Control and Prevention (CDC) has estimated there are as many as 18,000 cases of Legionnaire's disease annually. The US Occupational Safety and Health Administration (OSHA) has estimated that Legionnaires' disease results in about 4,000 deaths in the United States each year. Reported outbreaks of Legionnaires' disease have more than doubled in the past 10 years. Other plumbing-associated pathogens, such as *Pseudomonas* and non-tuberculous mycobacteria (NTM), may cause as much or more disease as *Legionella*, but lack of required reporting and other factors make quantification difficult. The primary disease transmission vectors for these plumbing associated pathogens are inhalation and aspiration.

Since the early 20th Century, water treatment and disinfection practices implemented in the United States and other developed countries have virtually eliminated incidence of waterborne enteric diseases, such as typhoid and cholera that result from fecal contamination of the public water supply. The focus of these historic, successful efforts has been the control of "traditional pathogens", waterborne pathogens of fecal origin that contaminate the source water and typically do not amplify in the potable water itself. The primary disease transmission vector for these traditional pathogens is ingestion.

*E. coli* is a reference organism of choice in traditional water treatment; it is widely used as the primary indicator of fecal contamination. Current data suggest that *E. coli* is almost exclusively derived from the feces of warm-blooded animals; its presence in drinking water is considered an indication of substantial post-treatment fecal contamination or inadequate treatment. *E. coli* is extremely sensitive to chemical disinfection, such as chlorination. Its presence in a water sample is considered a sure sign of a major deficiency in the treatment program or in the integrity of the distribution system. However, the absence of *E. coli* does not, by itself, provide sufficient assurance that the water is free of microbial contamination.

Constituents of water, pipe deposits and plumbing materials exert an initial chemical demand on oxidizing disinfectants, such as chlorine. The amount of disinfectant that remains after the initial oxidant demand is satisfied is called the "disinfectant residual". "Ct"—the concentration of the disinfectant residual [C] multiplied by the contact time, "t"—is a key concept used in development of traditional disinfection protocols. Ct tables have been developed for each drinking water disinfectant for a number of challenge organisms, primarily suspended (planktonic), traditional (enteric) indicator pathogens such as *E. coli* and Giardia.

In general, public drinking water supplies in developed countries are treated to government standards that make the water safe for intended use. In the United States, potable water supplied by community water systems is treated to National Primary Drinking Water Standards, a set of requirements developed by the United States Environmental Protection Agency (USEPA) under authority of the Safe Drinking Water Act (SDWA). Most regulatory mandates regarding drinking water have focused primarily on the quality of the water at the point it leaves the treatment plant.

It is increasingly recognized that the quality of regulation-compliant drinking water can deteriorate after it enters the distribution system, the series of pipes that transport water from the treatment plant to the customer. In 2006, at the request of USEPA, the National Academy of Sciences published a study by the Water Science Technology Board (WSTB) of the National Research Council (NRC), "*Drinking Water Distribution Systems: Assessing and Reducing Risks*". (NRC, 2006) The study highlighted the urgent need for new science that will enable cost-effective treatment of the distribution system for protection of public health and minimization of water quality degradation after water leaves the treatment plant. The distribution system is often categorized from largest to smallest components: transmission (trunk) mains, distribution mains, service lines, and premise plumbing. Typically, the water treatment utility owns and is responsible for the distribution system infrastructure up to the connection to the customer, which sometimes includes the service line. Almost always, the customer is responsible for the premise plumbing. The study highlights treatment challenges that are unique to premise plumbing.

The term "premise plumbing" refers to the piping within a building or home that distributes water to the point of use; it also includes equipment used to process the water—that is, to soften, filter, store, heat, and circulate the water before it exits the tap. Premise plumbing systems are comprised of a wide range of materials including copper, plastics, brass, lead, galvanized iron, and occasionally stainless steel. Many of these materials typically are not present in the main distribution system. Compared to other parts of the water distribution system, premise plumbing is characterized by longer water-residence times, more stagnation, lower flow conditions, higher surface area to volume ratio (owing to relatively lengthy sections of small-diameter pipe), lower (if any) disinfectant residual and higher water temperatures.

The distinctive characteristics of premise plumbing create a unique ecological niche and home to a robust microbial ecology.

The microbial colonization of plumbing systems occurs primarily through the formation of natural biofilms upon the interior surfaces of the plumbing. (Declerck, 2010; Murga et al., 2001) Biofilms are complex heterogeneous aggregates of microorganisms and exogenous materials embedded in a highly hydrated matrix commonly referred to as extracellular polymeric substances (EPS). EPS is made up of a variety of constituents, including polysaccharides, protein, lipids and nucleic acids. The development, chemical composition, microbial diversity, morphology and activity of biofilms are affected by a number of factors, including water temperature, pH, hardness, disinfection history and the composition of the plumbing surface upon which the biofilm forms. For example, biofilms that form on copper pipe in a domestic hot water system are different from the biofilms that form on the interior surfaces of transmission mains, even in the same overall water system.

Biofilm formation on a plumbing surface can be initiated when relatively small numbers of environmental microorganisms (such as are typically found in high-quality, regulation-compliant drinking water) enter the plumbing system, attach to the inside surfaces of pipes and equipment, excrete EPS and amplify to very large numbers. Pieces of the biofilm can shed or be dislodged and broadcast as respirable droplets in infectious bio-aerosols from the plumbing into the environment, for example through showerheads, faucet fixtures and ornamental fountains. Infection by these bio-aerosols is primarily by inhalation and aspiration, and sometimes wound infection.

Clinically important biofilm-associated microorganisms that colonize the interior surfaces of premise plumbing systems include Gram-negative environmental bacteria, such as *Legionella, Acinetobacter, Elizabethkingia (Flavobacterium), Stenotrophomonas, Klebsiella, Pseudomonas* and NTM.

*Legionella*, the most studied plumbing-associated pathogen, survives over a wide range of temperatures. It is acid tolerant to pH 2.0 (Anand et al., 1983) and able to survive temperatures of up to 70° C. (158° F.) (Sheehan et al., 2005). Subject to the availability of necessary nutrients (e.g., iron, L-cysteine), *Legionella* can grow in water at 20-50° C. *Legionella* proliferate vigorously in water at 32-42° C. (89.6-107.6° F.) with low levels of available nutrients, e.g., in unsterilized tap water (Yee and Wadowsky, 1982), especially in slow-flowing or stagnant water. *Legionella* is comparatively less susceptible to chlorination than *E. coli*, and reportedly can survive chlorine doses of up to 50 mg/L when contained inside protozoan hosts.

Bacteria and other biofilm-resident microorganisms often are physiologically different from their free-floating (planktonic) counterparts, and have been shown to be far more resistant to traditional disinfectants, such as chlorine. For example, biofilm bacteria grown on the surfaces of granular activated carbon particles, metal coupons, or glass microscope slides were 150 to more than 3,000 times more resistant to hypochlorous acid (free chlorine, pH 7.0) than were unattached cells. In contrast, resistance of biofilm bacteria to monochloramine disinfection ranged from 2- to 100-fold more than that of unattached cells. (LeChevallier, et al. 1988)

Protozoa play a defining role in the microbial ecology of plumbing system associated biofilms. Protozoa graze on biofilm organisms. A number of biofilm-associated pathogens (e.g., *Legionella*, NTM, *Pseudomonas*) are able to parasitize and replicate within species of FLA commonly found in drinking water. Once consumed and phagocytized by the protozoan host, these bacterial pathogens survive, replicate and are eventually dispersed to infect new hosts. While inside the host, the bacteria are protected from environmental stressors, such as disinfectants and high temperatures. In addition to promoting the bacteria's survival, this process reportedly can result in the up-regulation of the bacteria's virulence genes, and thus directly affect their ability to infect humans and cause disease. *L. pneumophila* has been shown able to parasitize and multiply in more than twenty different protozoan species, including *Acanthamoeba, Naegleria*, and *Hartmanella* (Donlan et al., 2005; Kuiper et al., 2004). Protozoa have been shown to be highly resistant to chlorine and other traditional drinking water disinfectants.

The disinfection of public water supplies still relies predominantly on chlorine, but also employs alternative disinfectants chlorine dioxide, monochloramines and ozone to treat water intended for human consumption. (White, G. C. 1999) Chlorine, chlorine dioxide and ozone are used at the treatment plant, sometimes sequentially, as "primary" disinfectants, to achieve water quality targets in the finished water—that is, at the point where the water leaves the plant. Chlorine and monochloramines are added to the water as "secondary" disinfectants, in order to maintain the quality of the distributed water all the way to the customer. In general, the anti-microbial efficacy of each of these disinfectants increases with temperature, approximately doubling with each 10° C. increase in water temperature. This finding is consistent with the Arrhenius equation, a well-known formula for the temperature dependence of reaction rates.

Chlorine is the chemical the most frequently used to disinfect public water supplies. The pH of the water being treated with chlorine greatly affects its disinfection efficacy. Chlorine dissolved in water exists as three species in equilibrium-chlorine gas ($Cl_2$), hypochlorite ion ($OCl^-$) and hypochlorous acid (HOCl). The ratio of the three components depends on the pH of the water. At pH below 2, chlorine gas becomes significant. When the pH is between 2-7, the equilibrium strongly favors hypochlorous acid, an effective antimicrobial agent. As pH increases above 7, hypochlorous acid dissociates to form hypochlorite ion, which has poor anti-microbial properties. At pH>8, hypochlorite ion dominates. Therefore, when chlorine is used to disinfect water, pH must be controlled to a lower pH in order to assure that hypochlorous acid, the anti-microbial species, predominates. The amount of chlorine that remains after the initial oxidant demand of the water is satisfied is known as the "free residual concentration". EPA regulations allow a free residual chlorine concentration in potable water of up to 4 mg/L. Chlorine at allowable dose levels has proven effective for inactivating a broad range of traditional (fecal-borne) pathogens in drinking water, *Cryptosporidium parvum*, an encysted protozoan enteric parasite, is the notable exception.

Chlorine dioxide is a relatively powerful, fast-acting disinfectant, which inactivates pathogens across a broad pH range, from about pH 5 to 9. Chlorine dioxide sometimes is used as an alternative to chlorine for primary disinfection; however, the ability of chlorine dioxide to persist in the distribution system is unclear. Chlorine dioxide typically is not used in the United States for secondary disinfection; however, it has been used as a secondary disinfectant in several European countries including Italy, Germany, France, and Switzerland.

The amount of chlorine dioxide that remains after the initial oxidant demand of the water is satisfied is known as the "free residual concentration." EPA regulations allow a free residual chlorine dioxide concentration in potable water of up to 0.8 mg/L. Chlorite ion, the EPA-regulated disinfection by-product of chlorine dioxide, has a maximum allowable concentration in potable water of 1.0 mg/L, which effectively limits the dose of chlorine dioxide that can be used to treat drinking water. The anti-microbial efficacy of chlorine dioxide at pH 5-9 for a broad range of traditional, fecal-borne pathogens in drinking water is roughly comparable or superior to that of chlorine at pH 5-7. Chlorine dioxide is more effective than chlorine against *Cryptosporidium*. Chlorine dioxide is highly soluble in water but, unlike chlorine, chlorine dioxide does not react with water (hydrolyze); rather, it exists as a dissolved gas. Chlorine dioxide at STP is approximately 10 times more soluble in water than is chlorine; the solubility of chlorine dioxide increases as the temperature of the water decreases.

Monochloramine is an oxidant sometimes used as a secondary disinfectant, in order to maintain a relatively weak but persistent disinfectant residual throughout a distribution system. Monochloramine reacts with organics at a much slower rate than chlorine; it is therefore often part of a strategy for minimizing formation of regulated disinfection by-products associated with chlorine. The anti-microbial efficacy of monochloramines at for a broad range of traditional, fecal-borne pathogens in drinking water is far less than that of chlorine or chlorine dioxide. (Van der Wende and Characklis, 1990)

The relative efficacy of chlorine, chlorine dioxide and monochloramines against biofilms and biofilm-associated organisms is different than vs. traditional pathogens. Information on chlorine dioxide efficacy against biofilms is inconsistent, though generally seems to be superior to that of chlorine. Chlorine has limited ability to penetrate biofilms or to inactivate biofilm-resident bacteria, while monochloramine is reportedly able to penetrate and inactivate organisms within biofilms. *M. avium*, an NTM species, is more resistant to chlorine than indicator bacteria and survives in distribution systems despite ambient chlorine residual concentrations; most strains appear to be more resistant to monochloramine compared to free chlorine. All NTM species are believed to be at least 100-fold more resistant to chlorine and other disinfectants compared to *E. coli* (Taylor et al., 2000).

Microbial control treatments applied to plumbing systems fall into two general categories, (1) acute and (2) continuous. Acute treatments typically are short-term interventions designed to remediate bio-contamination; continuous treatments typically are part of routine operations, intended to control bio-contamination. For premise plumbing, conventional acute treatment options have been thermal and chemical. Acute treatment generally been limited to emergency decontamination of premise plumbing systems associated with disease outbreaks, owing to the attendant health and safety dangers and damage to the physical plant (e.g., severe corrosion). (White, G. C. 1999)

High-temperature water (e.g., 170° F./77° C.) is sometimes used for acute treatment of domestic hot water systems, in a procedure called "thermal shock" or "super heat and flush". Thermal shock carries significant scalding hazards, is difficult to implement and can cause serious damage to plumbing systems. The high temperatures required to kill plumbing-associated pathogens, such as *Legionella*, are difficult to achieve and maintain for sufficient time consistently throughout all portions of a premise plumbing system. Even when target temperatures are achieved, thermal shock does not remove established biofilms.

Chemical disinfectants are sometimes used at higher-than-usual doses for acute treatment of pathogen-colonized potable water systems in a process called "chemical shock". The most frequently practiced form of chemical shock is "hyper-chlorination" using chlorine. The relatively high concentrations of chlorine employed reportedly cause corrosion, create leaks and otherwise adversely affect plumbing materials. Potable water systems are likely to be re-colonized within several weeks after hyper-chlorination. (Williams et al., 2011) Even when pH and chlorine concentration targets are achieved, hyperchlorination is reportedly ineffective at removing established biofilms. In most hyperchlorination protocols, chorine is used at doses sufficient to develop a free chlorine residual of at least 5 mg/L (up to 50 mg/L or more) that is maintained for up to 24 hours. Because chlorine efficacy is pH dependent, the water must be maintained at less than pH 8 and preferably less than pH 7.2. Application of such high concentrations of chlorine is likely to corrode pipes and damage plumbing system components, especially at the preferred pH levels where hypochlorous acid predominates. When flushed through taps, chlorine at the levels used for hyperchlorination can off-gas significantly with release of chlorine fumes substantially above OSHA limits.

A study of acute treatment of a hospital premise plumbing system used a shock dose of 50-80 mg/mL chlorine dioxide applied over an 8-hour period under acidic (low pH) conditions; the protocol included flushing of all outlets at 50-80 mg/mL for approximately 1 hour. Biofilm reportedly was reduced significantly in the cold and hot taps, but not eliminated; treatment of the showerheads was reportedly unsuccessful, with >3000 cfu/ml recovered. (Walker et al., 1997) When flushed through taps, chlorine dioxide at the levels employed in the study can off-gas significantly with release of chlorine dioxide fumes substantially above OSHA limits.

Chlorine, chlorine dioxide and monochloramines are used for continuous treatment of potable water inside of buildings, especially of domestic hot water. Studies with continuous application of chlorine dioxide in a hospital potable water system showed that an extended time (>12 months) was needed to achieve significant reduction in *Legionella* positivity in hot water system. (Srinivasan, et al., 2003)

The net present replacement value of premise plumbing is in excess of $0.6 trillion (NRC, 2006). Moreover, costs associated with premise plumbing failures due to corrosion are unpredictable, and include costs of property damage and mold growth. Corrosion of copper pipe, an important plumbing material, is a function of a number of complex variables and not fully understood. Chlorine, however, is known to be corrosive to copper pipe. At low pH where hypochlorous acid predominates, chlorine corrosion can be severe.

Mixtures of chlorine and chlorine dioxide have been reported in the literature but only in the context of making possible the use of cost advantageous processes for the production of chlorine dioxide or for minimizing the formation of toxic disinfection by-products in bulk water. For example, Rosenblatt et al. discloses the production of a mixture of chlorine and chlorine dioxide using a relatively low cost sodium chlorate-based process, with subsequent conversion of the chlorine component to chloramines by the addition of ammonia, or alternatively separation of the chlorine and chlorine dioxide, in order to remove chlorine and thereby avoid undesirable downstream effects (such as malodors) associated with chlorine-contaminated chlorine dioxide in distribution systems. (Rosenblatt, et al., 1994) Rittman et al. provides for the use of mixtures of chlorine and chlorine dioxide to minimize the formation of regulated disinfection by-products associated with chlorine treatment of drinking water in a water treatment plant. (Rittmann et al., 2002) In neither case is the use of a mixture of chlorine and chlorine dioxide for biofilm treatment taught, nor is the application of the mixture to premise plumbing. Katz et.al applied an equal dose of chlorine dioxide and chlorine at pH<7.2, conditions under which hypochlorous acid predominates, to disinfect the effluent from a municipal sewage treatment plant. (Katz et al., 1994) The Katz et al., results showed that the combination produced relatively-stable residuals of both disinfectants, and reduced the concentration of an undesirable disinfection byproduct. Katz et.al does not, however, teach use of the mixture for biofilm treatment, nor the application of the mixture to premise plumbing. In a study of the inactivation of *Legionella* in a model plumbing system, a combination of chlorine and chlorine dioxide did not show significant synergistic effect. (Zhang, 2007) Norgaard describes the use of chlorine dioxide to treat biofilms but never suggests combining with chlorine. In fact, Norgaard states that biofilm is unaffected by chlorination and points out disadvantages of using chlorine to treat premise plumbing due to its corrosive properties at low pH. (Norgaard, 2012).

In order to avoid excessive system noise and the possibility of erosion-corrosion, the generally accepted limits for flow velocities of domestic water are 8 feet per second for cold water and 5 feet per second in hot water, up to approximately 140° F. In systems where water temperatures routinely exceed 140° F., lower flow velocities such as 2 to 3 feet per second should not be exceeded.

SUMMARY

Plumbing-associated disease is a recognized, significant, growing public health problem. Effective, practicable means and method for treating premise plumbing systems, thereby preventing plumbing-associated disease, are lacking. Requirements for a viable means and method include (1) removing biofilm and (2) inactivating biofilm-associated pathogens, while (3) minimizing corrosion to the physical plant and (4) mitigating the environmental release of toxic chemical fumes. It is a surprising result of the methods of the present disclosure that use of a mixture chlorine and chlorine dioxide can remove biofilm and/or inactivate biofilm-associated pathogens. It is a further surprising result that such mixtures can be effective under conditions that are far less corrosive to plumbing system material than the prior art premise-plumbing treatment methods, which do not use mixtures of chlorine and chlorine dioxide and which prescribe the use of lower pH with chlorine-containing solutions. Because the efficacy of chlorine diminishes as pH increases, it is especially surprising the mixtures of the present method demonstrates superior biofilm eradication over chlorine or chlorine dioxide alone, even at pH>7.2. As used herein, "biofilm eradication" or "eradicating a biofilm" refers to partially or completely destroying a biofilm, which can include partially or completely inactivating biofilm-associated pathogens and/or partially or completely dislodging and/or removing the biofilm from the surface to which it is adhered.

In one embodiment, the present disclosure provides a method for eradicating a biofilm from a plumbing system, the method comprising contacting the biofilm on interior surfaces of the plumbing system with a treatment solution comprising a mixture of chlorine and chlorine dioxide. In some embodiments, the method can be carried out wherein the plumbing system is a premise plumbing system. In some embodiments, the method can be used in a plumbing system comprising a building water system that is attached to and fed by a premise plumbing system. In some embodiments, the building water system fed by a premise plumbing system comprises a cooling tower.

In other embodiments of the method for biofilm eradication from a plumbing system, the treatment solution comprises a mixture of chlorine and chlorine dioxide in a ratio by weight of 50:50. In some embodiments, the treatment solution has a pH of about 6.5 to about 9.0, and optionally, a pH of about 7.2, about 7.5, about 8.0, or even about 8.5. In some embodiments, the treatment solution has a pH of about 6.5 or greater, about 7.2 or greater, about 7.5 or greater, about 8.0 or great, or even about 8.5 or greater.

In one aspect of the present invention, methods are disclosed for the treatment of premise plumbing system wherein the methods comprise contacting biofilms on the interior surfaces of the plumbing system with a treatment solution, the treatment solution comprising a mixture of chlorine and chlorine dioxide, and having a pH≥6.5, a pH≥7.2, a pH≥7.5, a pH≥8.0, a pH≥8.5, or a pH≥9.0.

In some embodiments of the method for biofilm eradication, the treatment solution concentrations of each of chlorine and chlorine dioxide are at least 1.5 mg/L (i.e., 3 mg/L total disinfectant). In some embodiments, the treatment solution concentrations of each of chlorine and chlorine dioxide are at least 1.5 mg/L, at least 3.0 mg/L, at least 6.0 mg/L, at least 12.0 mg/L, or at least 50.0 mg/L. In some embodiments, the treatment solution, in addition to having a concentration of each of chlorine and chlorine dioxide described above, optionally also can have a pH of about 6.5, about 7.2, about 7.5, about 8.0, about 8.5, or about 9.0.

As used herein, the "treatment solution" is the solution comprising the desired mix of disinfecting reagents (e.g., a 50:50 chlorine:chlorine dioxide mix) that is present in the plumbing system and thereby contacting the biofilm on the interior surfaces. In some embodiments of the method for biofilm eradication, the treatment solution is contacted with the interior surfaces of the plumbing system by applying a mixture of chlorine and chlorine dioxide in water into the plumbing system and allowing it to circulate in the premise plumbing system. In some embodiments, the treatment solution can be contacted with the interior surfaces of the plumbing system by separately applying chlorine and chlorine dioxide to the plumbing system such that the treatment solution mixture forms in situ. As described elsewhere herein, residual water can be present in the plumbing system and thereby can become part of the treatment solution as a diluent of the component disinfecting reagent solution(s) added to the system.

In some embodiments, the treatment solution should be prepared such that the pH when in the plumbing system is about pH 7.2 or greater. In some embodiments of the method of treatment, the treatment solution has a pH between 7.2 and 9.0. In some embodiments the treatment solution has a pH>8.0. In some embodiments, the treatment solution has a pH between 8.0 and 9.0.

In some embodiments, the methods of treatment for biofilm eradication of the present disclosure can be used in plumbing systems wherein the interior surfaces of the plumbing system are colonized with a biofilm comprising a microorganism selected from the group consisting of *Acinetobacter, Elizabethkingia (Flavobacterium), Escherichia*

*coli, Klebsiella, Legionella,* non-tubercular Mycobacteria (NTM), *Pseudomonas, Stenotrophomonas,* protozoa, and combinations thereof.

Furthermore, due to the low corrosiveness of the treatment solutions when used at high pH (e.g., pH 7.2 and above), in some embodiments the method of treatment can be carried out wherein the interior surfaces of the plumbing system comprise a material selected from the list consisting of copper, brass, iron, galvanized steel, stainless steel, PVC, HDPE, and combinations thereof.

Generally, in using the methods of the present disclosure, the presence of any residual water in the plumbing system or additional water added during the method can affect the treatment solution disinfectant concentrations and the pH. Additionally, as described elsewhere herein, residual water in the system can affect the free residual concentration of the chlorine and chlorine dioxide disinfectants. Accordingly, the presence and chemical characteristics of water in the system should be taken into consideration when using the methods of treatment disclosed herein.

In some embodiments, the concentration of each of the components of the treatment solution can be at or below the levels permitted in drinking water or higher than the levels permitted in drinking water. Thus, in some embodiments of the method of treatment, the chlorine-to-chlorine dioxide ratio by-weight in the treatment solution can be from 80:20 to 20:80, and in some preferred embodiments, can be a ratio by-weight of 50:50. In general, the higher the concentration of the treatment solution, the lower the amount of contact time required to treat the premise plumbing.

In some embodiments of the methods of treating premise plumbing disclosed herein, the chlorine and chlorine dioxide concentration levels in the treatment solution are 0.8 mg/L or less residual chlorine dioxide and 0.4 mg/L or less residual chlorine. In other embodiments, the chlorine and chlorine dioxide concentration levels in the treatment solution are greater than 0.8 mg/L residual chlorine dioxide and greater than 0.4 mg/L residual chlorine.

In another aspect of the present invention, the treatment solution is effective across a broad range of temperatures, including the full range of temperatures characteristic of domestic water (0-60° C.; 32-140° F.). Accordingly, the methods of treating premise plumbing disclosed herein can be carried out across a wide range of temperatures, and even at cold water temperatures. In some embodiments, the temperature of the treatment solution is between 55 to 80° C. In other embodiments, the temperature of the treatment solution is between 20 to 55° C., and in some embodiments, the temperature of the treatment solution is between 0 to 20° C. Indeed, application at cold water temperatures offers the advantage of increased chlorine dioxide solubility. Also, colder treatment solution can be circulated faster than warmer treatment solution and offers more latitude in achieving desired turbulent flow, which can enhance biofilm removal by virtue of increased sheer forces and better mixing at the treatment solution:biofilm interface. Application of the treatment solution at warmer temperatures offers additional efficacy due to increased rates of reaction, but increases the release of chemical fumes (off gassing) and the rate at which the treatment solution reacts with organic constituents of the water and with plumbing materials. An additional consideration is that aqueous solutions at temperatures>43.3° C. (110° F.) can scald.

In another aspect of the present invention, the application of the treatment solution can be advantageously carried out by circulating through the premise plumbing at a flow rate a Reynolds value of at least 4,000.

When in contact with the plumbing system surfaces, the treatment solution can be at temperatures between 0 and 80° C. (32-176° F.) and pH values ranging between pH 6.5-9, preferably pH 7.2-8. The treatment solution may also include a complexing agent, such as sodium silicate, to further mitigate corrosion, especially when the treatment solution is applied at higher temperatures and higher concentration. In another aspect, the present invention is directed to methods for containing gases at open taps during acute chemical treatment of premise plumbing systems when the treatment solution is being flushed through taps. The method comprises attaching a conduit to an outlet (e.g., tap), wherein the conduit walls are partially or fully impermeable to chlorine and chlorine dioxide gas, thereby forming a partial or complete barrier to the transmission of these gas vapors. The conduit may be a pipe, tube, hose, channel or the like. The opposing end of the conduit is directed toward a physical or chemical sink that prevents liberation of chemical fumes into the environment; examples of embodiments include, without limitation, the opposing end of the conduit being (a) terminated just above a drain, with a small air gap; (b) fitted into a drain or (c) attached to the tapered end of a funnel wherein contact between the conduit and the funnel is sealed, and the funnel is a barrier to chlorine dioxide gas and is (i) fitted to a drain, (ii) secured to a drain, (iii) sealed to a drain, or (iv) in close proximity to a drain. In another example, the opposing end of the conduit also may be passed through a plug fitted in the drain, wherein the plug occludes the vapor path from the drain. In one variation, the plug may be a sponge soaked in a scrubber solution, such as an aqueous solution containing sodium thiosulfate (a reducing agent) that inactivates the chlorine and chlorine dioxide fumes. The sponge is fitted into a drain and may contain a chemical scrubber. The water source is a (a) tap, (b) shower head, or (c) fixture. The conduit may contain (a) check valves, (b) remotely actuated valves, (c) temperature sensors, (d) pH sensors, (e) chemical sensors, (f) devices for data acquisition, (g) devices for data storage, and/or (h) devices for data transmission. The treatment solution is passed through the conduit while maintaining isolation between potable water and waste water systems, as may be required by plumbing codes.

DETAILED DESCRIPTION

Figures 1A, 1B, 1C, 1D:
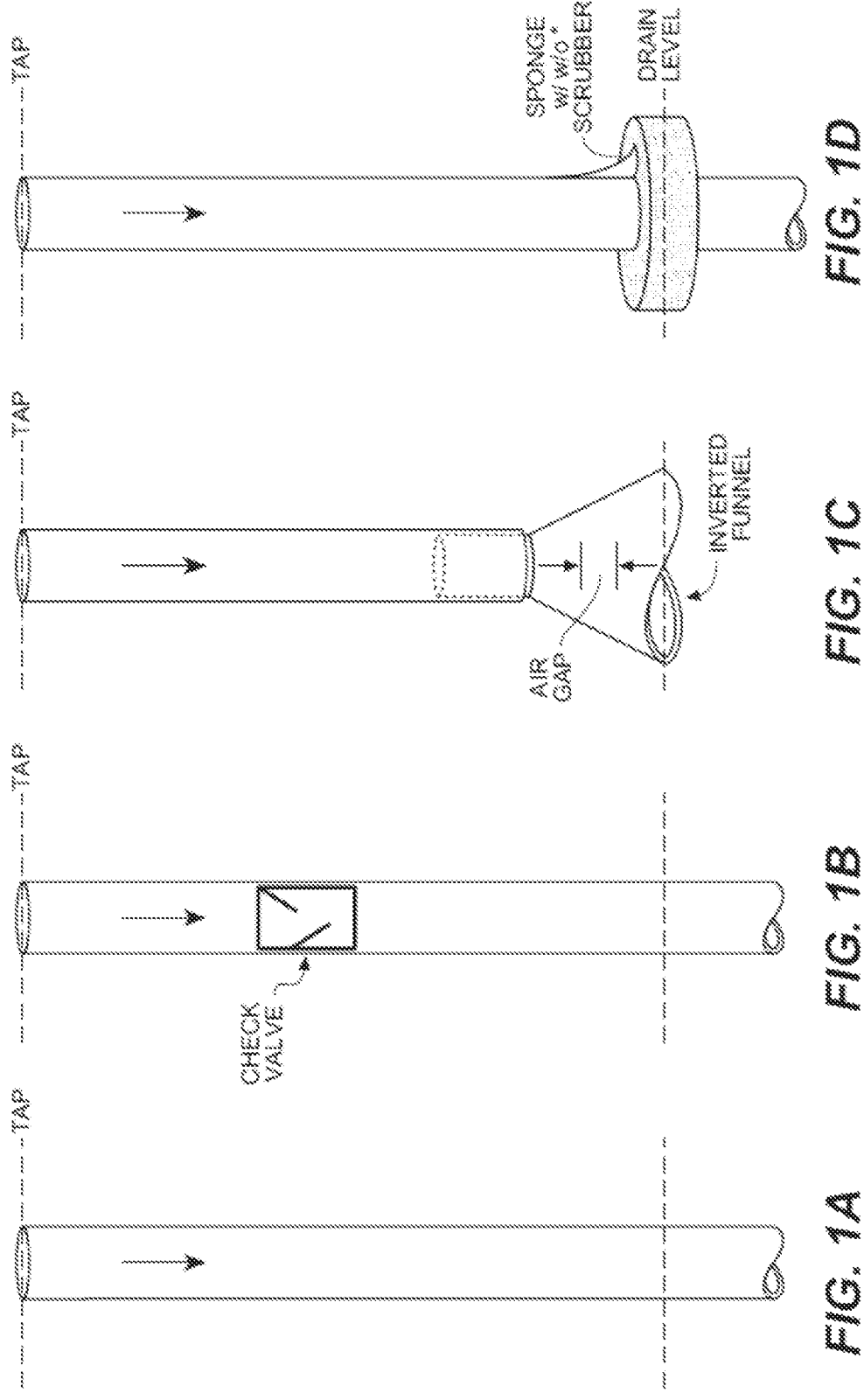
FIG. 1A is a schematic illustration of a conduit between the tap and the drain. The upper dashed line indicates the level of the tap and the lower dashed line indicates the level of the drain. The arrow indicates the direction of water flow, which is from the tap to the drain.
FIG. 1B is a schematic illustration of a conduit between the tap and the drain. The conduit contains a check valve. The upper dashed line indicates the level of the tap and the lower dashed line indicates the level of the drain. The arrow indicates the direction of water flow, which is from the tap to the drain.
FIG. 1C is a schematic illustration of a conduit between the tap and the drain. The conduit is attached to the inverted end of a funnel. The wide end of the funnel is at the level of the drain. The upper dashed line indicates the level of the tap and the lower dashed line indicates the level of the drain. The arrow indicates the direction of water flow, which is from the tap to the drain.
FIG. 1D is a schematic illustration of a conduit between the tap and the drain. The conduit is fitted through a sponge and the sponge is at the level of the drain. The upper dashed line indicates the level of the tap and the lower dashed line indicates the level of the drain. The arrow indicates the direction of water flow, which is from the tap to the drain.
Figure 1E:
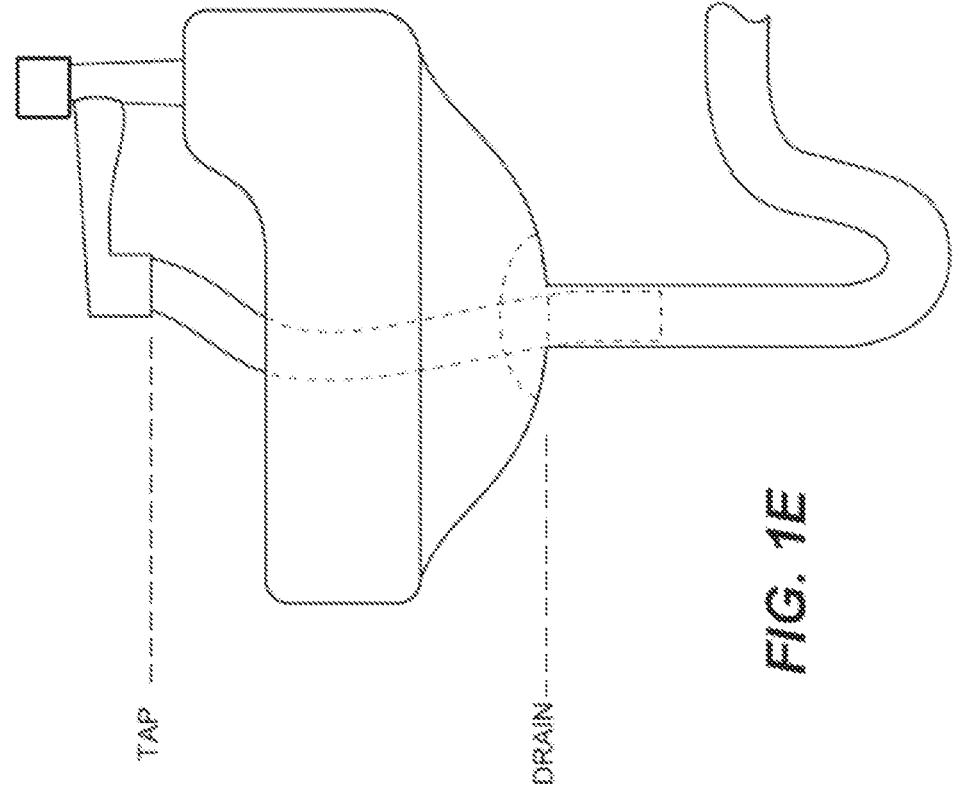
FIG. 1E illustrates a conduit attached to the tap of a sink and leading into the drain of the sink.

For the descriptions herein and the appended claims, the singular forms "a", and "an" include plural referents unless the context clearly indicates otherwise. The use of "comprise," "comprises," "comprising" "include," "includes," and "including" are interchangeable and not intended to be limiting. It is to be further understood that where descriptions of various embodiments use the term "comprising," those skilled in the art would understand that in some specific instances, an embodiment can be alternatively described using language "consisting essentially of" or "consisting of." The technical and scientific terms used in herein will have the meanings commonly understood by one of ordinary skill in the art, unless specifically defined otherwise.

Where a range of values is provided, unless the context clearly dictates otherwise, it is understood that each intervening integer of the value, and each tenth of each intervening integer of the value, unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding (i) either or (ii) both of those included limits are also included in the invention. For example, "1 to 50" includes "2 to 25", "5 to 20", "25 to 50", "1 to 10", etc.

It is to be understood that both the foregoing general summary and the following detailed description, including the drawings and examples, are exemplary and explanatory only and are not restrictive of the inventions of this disclosure.

Mixtures of chlorine and chlorine dioxide in a treatment solution are surprisingly effective for eradicating biofilms on interior surfaces of plumbing systems via killing (or inactivating) of biofilm-associated pathogens and dislodging and/or removing the biofilms, even at high pH (e.g., pH>7.2) which results in minimal plumbing system corrosion. This discovery holds true for treatment solutions of chlorine and chlorine dioxide where the concentrations of these disinfectants are at the relatively-low levels permitted in drinking water (e.g., 0.8 mg/L chlorine dioxide; 4 mg/L chlorine). The method and treatment solutions are also effective to eradicate biofilms at much higher concentrations (e.g., 25 mg/L chlorine dioxide; 25 mg/L chlorine). Additionally, it is surprising that this discovery holds true at pH values much greater than 7.2, (e.g., pH 8.5), and even in domestic cold water (e.g., 0-20° C./32-68° F.).

The co-application of a complexing agent, such as sodium silicate, with treatment solution can provide enhanced protection of the metallic components of premise plumbing materials from corrosion, especially when the treatment solution is applied at higher concentrations and higher temperatures.

The penetration of biofilm on the surfaces of pipes is benefitted by increased flow and most markedly by turbulent flow at the biofilm:treatment solution interface. Without being limited by theory, we believe this is likely is due to enhanced contact between the treatment solution and the surface being treated by eliminating a boundary layer associated with laminar flow and/or stagnant contact. The degree of turbulence that can be achieved is a function of flow rate and pipe diameter; for example, a 2-inch diameter pipe requires a flow rate of approximately 2 feet per seconds to achieve turbulent flow (Reynolds number ~4,000).

The removal of biofilm on the treated surfaces is also benefitted by increased flow. Without being limited by theory, we believe this is because of increased shear forces that have a scouring effect on the biofilm.

Based on these discoveries, certain embodiments of the invention provide novel means and methods for treatment of premise plumbing systems.

For treatment of premise plumbing systems, it is desirable to remove surface-attached biofilm and to kill biofilm-associated pathogens, such as bacteria, viruses and protozoa, without causing significant physical damage to pipes and other premise plumbing system components and without environmental release of noxious chemical fumes. Removing surface-attached biofilm and killing biofilm-associated pathogens without damaging copper pipes and other system components can be met by flushing the premise plumbing system with a mixture of chlorine and chlorine dioxide in aqueous solution (treatment solution). The treatment solution can comprise a mixture of chlorine and chlorine dioxide at a ratio of 80:20 to 20:80 (weight basis) at a total concentration of up to 200 mg/L for up to 24 hours. The treatment described herein may be advantageously practiced at treatment solution pH values greater than neutral, especially pH>7.2, at typical cold water temperatures (e.g., 0-20° C.; 32-68° F.) up to temperatures at which scalding becomes a risk (43.3° C./110° F.). Co-treating with a complexing agent, such as sodium silicate, can further enhance compatibility of the treatment solution with plumbing system materials, especially metals such as copper and brass.

Environmental release of noxious chemical fumes at the tap can be avoided by utilizing a gas-containment device, such as a hose that contains chlorine and chlorine dioxide vapors, which hose is attached to a tap and terminates near or is attached to a drain or chemical scrubber and provides containment of chemical fumes and directs the flow of treatment chemicals from the tap down a drain or into a chemical scrubber. The gas-containment device can be configured in many ways, and can incorporate advantageous features such as check valves, remotely actuated valves, and sensors for temperature, pH and disinfectant concentration, as well as data acquisition, storage and transmission means. The gas-containment device can be used in conjunction with flushing the treatment solution, or with other volatile treatment chemicals, such as hypochlorite (bleach) or chlorine dioxide, that may be used to flush plumbing systems.

In certain plumbing systems with surfaces coated by a mixture of lime scale, iron sediment and biofilm, such as those that receive water with high mineral content (hard water), treatment can be carried out by first applying a low pH treatment to dissolve the limescale, and iron, preferably in conjunction with a complexing agent, such as sodium silicate. The first step is followed by utilizing the treatment solution described herein at higher pH (e.g., >7.2) to remove the biofilm. This sequence can be repeated, if necessary, until the limescale, iron sediment and biofilm have been removed as determined by sampling or visual inspection.

EXAMPLES

Various features and embodiments of the disclosure are illustrated in the following representative examples, which are intended to be illustrative, and not limiting. Those skilled in the art will readily appreciate that the specific examples are only illustrative of the invention as described more fully in the claims which follow thereafter. Every embodiment and feature described in the application should be understood to be interchangeable and combinable with every embodiment contained within.

Example 1: Eradication of *Pseudomonas* Biofilms Using Solutions of Chlorine, Chlorine Dioxide, and a Mixture of Both This example illustrates the use of a mixture of chlorine and chlorine dioxide for removing biofilms of *Pseudomonas aeruginosa*. These results show the efficacy of this treatment solution even at pH 6.5, and the surprising advantage of such mixtures at pH 7.5 relative to treatment solutions comprising either chlorine or chlorine dioxide alone for the treatment of biofilms.

Overview of Testing Method

*Pseudomonas aeruginosa* biofilms are challenged with the reagents chlorine dioxide ("CD"), Chlorine (sodium hypochlorite; "Bleach") or a mix of both reagents in equivalent volume proportions ("Mix"), at approximately pH 6.5 and pH 7.5 to assess their ability for biofilm inactivation, as measured by a Minimal Biofilm Eradication Concentration (MBEC) assay. This MBEC assay measures the ability of a treatment solution to eliminate bacteria from already grown biofilms by killing the microbial cells and/or dislodging the biofilm.

The MBEC assay protocol used is an adaptation of the ASTM-standardized MBEC method. Briefly, biofilms are grown in a Calgary biofilm device, which is a 96 well plate with a lid that when in place has 96 individual pegs that protrude into the wells of the plate (see e.g., Ceri et al., 1999). The bacterial cells in the wells form biofilms on the submerged pegs. After a 20 h growth period, these biofilms formed on the pegs are challenged by placing the pegged lid on a 96-well plate of serial dilutions of the disinfectants to be tested (e.g., the CD, Bleach, or Mix), along with the required controls. All challenges were performed in a Biosafety Level 2 cabinet with a challenge exposure time of 30 minutes at a temperature of 22-25° C. In the case of CD, products are prepared fresh from highly concentrated stock solution minutes before the challenge. Reagent pH and concentration stability are tested for the CD working stock solutions, using either water or a borate-boric acid buffer as solvents. The concentration ranges for disinfectant reagents are from approximately 3 ppm to approximately 50 ppm.

After the challenge, the pegged lid is transferred to a recovery plate containing a sodium bisulfite solution. Sonication of the recovery plate with the pegged lid induces detachment of the biofilm from the pegs into the wells of the recovery. Viable bacterial cell counts from each peg are determined by culturing the recovery plate. The extended MBEC assay protocol and methods of preparing the disinfectant reagent stock solutions used in the challenge are included in the Materials and Methods section provided below.

Results

Results for CD, Bleach and the Mix challenges can be seen in Tables 1, 2 and 3, respectively. Bleach challenge shows a pH-dependent effect for biofilm reduction, consistent with the literature, except for anomalous results at ~3 ppm. When Mix (Bleach and CD) was used (Table 3), at both pH 6.5 and pH 7.5 efficacy against biofilms was superior to the efficacy of either of these disinfectant reagents alone. This is most clearly demonstrated by comparing the dose of the Mix of 6.25 ppm of each component (12.5 ppm total) vs. 12.5 ppm of either component individually.

TABLE 1

Results of challenge of *P. aeruginosa* biofilms with CD.

| pH 6.5 | | pH 7.5 | |
|---|---|---|---|
| Concentration (ppm) | $Log_{10}$ reduction $(CFU/mm^2)$ | Concentration (ppm) | $Log_{10}$ reduction $(CFU/mm^2)$ |
| 50.0 | Total inhibition | 50.0 | total inhibition |
| 12.5 | 2.34 | 12.5 | 2.49 |
| 6.25 | 2.56 | 6.25 | 2.38 |
| 3.12 | 0.82 | 3.12 | 1.63 |

$Log_{10}$ reduction = logarithm of the number of Colony Forming Units (CFU) per $mm^2$ after culturing the ultrasound-recovered biofilm.

TABLE 2

Results of challenge of *P. aeruginosa* biofilms with Bleach.

| pH 6.5 | | pH 7.5 | |
|---|---|---|---|
| Concentration (ppm) | $Log_{10}$ reduction $(CFU/mm^2)$ | Concentration (ppm) | $Log_{10}$ reduction $(CFU/mm^2)$ |
| 50.5 | Total inhibition | 50.5 | Total inhibition |
| 12.6 | Total inhibition | 12.6 | 3.03 |
| 6.31 | Total inhibition | 6.31 | 1.91 |
| 3.15 | 0.16 | 3.15 | 0.96 |

$Log_{10}$ reduction = logarithm of the number of Colony Forming Units (CFU) per $mm^2$ after culturing the ultrasound-recovered biofilm.

TABLE 3

Results of challenge of *P. aeruginosa* biofilms with a Mix (CD and Bleach).

| pH 6.5 | | pH 7.5 | |
|---|---|---|---|
| Concentration (ppm) | $Log_{10}$ reduction $(CFU/mm^2)$ | Concentration (ppm) | $Log_{10}$ reduction $(CFU/mm^2)$ |
| 50.0 | Total inhibition | 50.0 | Total inhibition |
| 12.5 | Total inhibition | 12.5 | Total inhibition |
| 6.25 | 3.08 | 6.25 | Total inhibition |
| 3.13 | 2.18 | 3.13 | 1.99 |

$Log_{10}$ reduction = logarithm of the number of Colony Forming Units (CFU) per $mm^2$ after culturing the ultrasound-recovered biofilm.

Detailed Materials & Methods

Preparation of concentrated CD solution: If available, pour approximately 50 mL of a CD solution in two 1 L glass containers that can be airtight sealed. Otherwise, use commercial bleach to treat this glassware. Make the liquid moisten all of the inner surface of the flasks, and let them stand in the dark at room temperature overnight. Add 2 L of sterile, distilled water to a pouch containing the CD-producing reagents. Cap the pouch, and mix by inverting it several times. Let stand for 2 hours at room temperature. Rinse with sterile, distilled water the glassware from point 2, and cover them with tin foil. Transfer the Concentrated CD solution to the glass bottles, so that the air space on top of the solution is as minimum as possible. Store the solution at 4° C. until needed. Prepare 30 mL of 1:500 to 1:1000 dilutions. Transfer 10 mL aliquots to 20 mL bottles of the quantitation system (CD colorimeter). Use aluminum foil to cover the bottles. Add 3 drops of glycine to each bottle, cap it, and mix. Add the content of one bag of DPD to each bottle with a CD solution. Mix by gently inverting the tubes. Use a bottle with water to blank the colorimeter (make sure you are using the CD, and not the chlorine (Bleach) colorimeter), and then measure the concentration. If reading is >2.5, prepare a higher secondary dilution (1:1500) and repeat the process. Average the readings and multiply by the dilution factor to determine the power (in ppm) of the concentrated solution. Label the bottles from with date and concentration.

Preparation of working CD stock solution: Fill a 50 mL polypropylene tube with the concentrated solution, and cover it with aluminum foil. Let the solution reach room temperature while protected from light. In a fresh 50 mL polypropylene tube, mix the concentrated solution with sterile, distilled water, so that it is diluted to the working concentration (e.g., 100 ppm), in a final volume of 50 mL. Close tightly the tube, and mix gently by inversion. Add 0.1M NaOH in 10 μL increments, mix and measure pH. Repeat this step until the desired pH is reached. Also, estimate pH using strips of pH indicator paper. Prepare 1:200 dilutions (30 mL), and verify the working concentration using the colorimeter (as described in making concentrated CD solutions). Use concentration estimation strips for double checking. Submerge the quantitation end of the strip in the solution for 2 seconds. Holding the colorimetric coupon upright, wait for 10 seconds, and then compare its color with the reference pallet. Label the tube, and store it at 4° C.

Preparation of IX borate-boric acid buffer working CD stock solutions: In a fresh 50 mL polypropylene tube, place concentrated CD solution so that the final concentration after dilution to a volume of 50 mL will be the working concentration (e.g. 100 ppm). Add 1x borate buffer to reach 40-45 mL. Close tightly the tube, and mix gently by inversion. Measure pH, and add 0.5M boric acid in 1 mL increments (or less if needed) until the desired pH is reached. Complete to 50 mL volume with sterile, distilled water. Determine final concentration as described above for CD stock solution.

Stability testing of working CD stock solutions: The method for pH and concentration stability testing consisted of diluting CD from a concentrated stock solution (approximately 590 ppm) to the working stock solution concentration (100 ppm) using water and adding 0.1M NaOH in small amounts until the desired pH was reached. Alternatively, the reagent was diluted to its working concentration in a combination of 1x borate buffer (measured pH 8.8) and 0.5M boric acid (measured pH 4.14). The desired pH levels were reached by adjusting the proportion of boric acid in the solution.

Initial concentration estimation of starting bleach solution: Bleach can come at concentration spanning 1 to 8% (i.e., 10000 to 80000 ppm). The following initial concentration estimation method is used to determine this starting concentration. In a new polypropylene tube, prepare 15 mL of a 1:500 dilution in Ultra-Pure Water (UPW). Place 10 mL of UPW in the 20 mL bottles of the quantitation system (C12 colorimeter). Put aside one of the bottles to use it as blank. Replace either 100 or 50 μL of UPW with the 1:500 dilution from step (1) (i.e., make 1:100 or 1:200 further dilutions, this will make final dilutions of 1:50000 and 1:100000 respectively). Add the content of one bag of DPD reagent to each bottle with a CD solution. Mix by gently inverting the tubes. Blank the colorimeter (make sure you are using the chlorine, and not the CD colorimeter), and then measure the concentration. If reading is >2.5, prepare a higher secondary dilution (for example 1:1500) and repeat the process. Average the readings and multiply by the dilution factor to determine the power (in ppm) of the concentrated solution. Label the original bottle with date and estimated concentration.

Preparation of bleach working stock solutions: Fill a 50 mL polypropylene tube with the concentrated Bleach solution. Let the solution reach room temperature. In a fresh 50 mL polypropylene tube, mix the concentrated solution with sterile, distilled water, so that it is diluted to the working concentration (e.g. 100 ppm), in a final volume of 50 mL. Close tightly the tube, and mix gently by inversion. Add 1N HCl in 10 μL increments, mix as in (9.2) and measure pH. Repeat this step until the desired pH is reached. Also, estimate pH using strips of pH indicator paper. Prepare 1:200 or 1:100 dilutions, and verify the working concentration as before (steps 2-6). Label the tube, and store it at 4° C. until use.

MBEC Assay Protocol

The following equipment, reagents, and methods are used to carry out the MBEC assay protocol for testing disinfectant efficacy of chlorine dioxide (CD), chlorine (Bleach) and a mixture of chlorine dioxide and bleach (Mix) against *Pseudomonas aeruginosa* biofilm.

A. Assay method: All steps should be performed using aseptic techniques and in an aseptic environment.

1. Bacterial culture (2 days before the MBEC assay).
   1.1. Thaw an aliquot of a working stock of *Pseudomonas aeruginosa* (ATCC 27835) and use it to streak plate on tryptic soy agar ("TSA") prepared according to manufacturer's directions.
   1.2. Incubate at 35° C. for 16-18 h.
   1.3. Pick an isolated colony and with it inoculate 200 mL of sterile tryptic soy broth ("TSB") prepared according to manufacturer's directions.
   1.4. Incubate at 35° C. 150 rpm for 16 to 18 h. Viable bacterial density should be $10^8$ CFU/mL or higher and may be checked by serial dilution and plating.
   1.5. Prepare a 25 mL 1:1000 dilution in TSB, to adjust cell density to approximately $10^5$ CFU/mL. Vortex the diluted sample for approximately 10 s.
   1.6. Perform seven 10-fold serial dilutions from step (1.5) in triplicate.
   1.7. Spot plate 20 μL of the serial dilutions from $10^0$ to $10^{-7}$ on a series of TSA plates. Label plates and incubate them at 35° C. for 16-18 h.
2. Growth of biofilm
   2.1. Open a package containing a new MBEC device.
   2.2. Transfer 25 mL of the inoculum prepared in (1.5) into a sterile reagent reservoir.
   2.3. Add 150 μL to each well of the 96-well plate packaged with the MBEC device, excluding columns 9 to 11 and A12, B12 and C12.
   2.4. Place the peg lid onto the microplate, making sure that the orientation of the wells matches that of the peg lid (i.e., peg A1 must be inserted into A1 well).
   2.5. Using the orbital shaker and humidified incubator, keep the device at 33-37° C.
   2.6. For best biofilm quantitation, the replicate MBEC devices should be prepared according to section 7.
3. Biofilm growth check
   3.1. Using sterile (flamed) pliers, grab peg D12 close to the lid to avoid contact with the biofilm. Break off the peg and place it in a sterile microfuge tube containing 1.0 mL of buffered water ("buffered water"=0.0425 g $KH_2PO_4$/L distilled water, filter-sterilized and 0.405 g $MgCl \cdot 6H_2O$/L distilled water; filter-sterilized, as according to ASTM Method 9050 C.1.a).

3.2. Repeat step (3.1) with wells E12 to H12 into respective microfuge tubes.

3.3. Place the stainless steel insert tray into the sonicator. Place the tubes from 3.1 and 3.2 into the tray and sonicate on high for 25-35 min.

3.4. Make 1.0 mL 10-fold serial dilutions in buffered water and spot plate on TSA. Incubate at 35° C. for 16-18 h.

4. Preparation of challenge plate 4.1. Use a sterile 96-well, two corners plate, to prepare the challenge plate according the challenge plate set-up map shown below.

|   | 1 | 2 | 3 | 4 | 5 | 6 | 7 | 8 | 9 | 10 | 11 | 12 |
|---|---|---|---|---|---|---|---|---|---|----|----|----|
| A | 100 | 100 | 100 | 100 | 100 | 50:N | N | UC | | | | SC |
| B | 50 | 50 | 50 | 50 | 50 | 50:N | N | UC | | | | SC |
| C | 25 | 25 | 25 | 25 | 25 | 50:N | N | UC | | | | SC |
| D | 12.5 | 12.5 | 12.5 | 12.5 | 12.5 | 50:N | N | UC | | | | BGC |
| E | 6.25 | 6.25 | 6.25 | 6.25 | 6.25 | 50:N | N | UC | | | | BGC |
| F | 3.13 | 3.13 | 3.13 | 3.13 | 3.13 | 50:N | N | UC | | | | BGC |
| G | 1.56 | 1.56 | 1.56 | 1.56 | 1.56 | 50:N | N | UC | | | | BGC |
| H | 0.78 | 0.78 | 0.78 | 0.78 | 0.78 | 50:N | N | UC | | | | BGC |

4.2. Prepare 20 mL of the desired disinfectant stock solution.

4.3. Add 200 µL of sterile TSB to well A12 of the challenge plate. This will be the sterility control (SC).

4.4. Add 200 µL of sterile neutralizer to column 7 and well B12. These will be the neutralizer toxicity control (N) and sterility control.

4.5. Add 100 µL of sterile neutralizer to column 6, followed by 100 µL of disinfectant. This will be the neutralizer effectiveness control.

4.6. Add 200 µL of buffered water to column 8 and well C12. These will be untreated control (UC) and buffered water sterility control.

4.7. Add 100 µL of buffered water to columns 1 through 5 (rows B through H).

4.8. Add 200 µL of stock disinfectant to columns 1 through 5 (row A).

4.9. Add 100 µL of the disinfectant stock solution to columns 1 through 5 (rows B and C).

4.10. Use a multichannel micropipette to mix the contents of columns 1 through 5 (row C) by pipetting up and down. Keep the tips in the micropipette for the next step.

4.11. Transfer 100 µL from the wells in row C to the corresponding wells in row D. discard the tips.

4.12. Using fresh tips, mix by pipetting the contents in row D, columns 1 through 5.

4.13. Transfer 100 µL from row D to row E. Discard the tips after each transfer and mix with fresh ones.

4.14. Repeat the process down the length of the plate until row H.

4.15. Discard 100 µL from row H, columns 1 to 5.

4.16. Add 100 µL of buffered water to rows C through H of columns 1 through 5.

5. Disinfectant challenge of biofilm 5.1. Prepare a rinse plate by adding 200 µL of buffered water to each well of a new 96-well, 2-corners plate.

5.2. Prepare recovery plate by adding 200 µL of neutralizer to each well of a new 96-well, 2-corners plate.

5.3. Rinse the planktonic bacteria from the biofilm that formed on the lid of the MBEC device by setting the lid into the rinse plate for 10 s.

5.4. Transfer the MBEC lid to the challenge plate and incubate at room temperature during the contact time recommended by the manufacturer.

5.5. After the contact time, transfer the MBEC lid to the recovery plate containing the neutralizer.

6. Biofilm growth quantitation (from replicate biofilm plate)

6.1. Prepare a staining plate by adding 200 µL of 0.1% crystal violet solution into columns 1 through 8 and column 12 of a fresh 96-well, 2 corners plate.

6.2. Transfer the pegged lid of the replicate recovery plate to the staining plate.

6.3. Incubate at room temperature for 30 minutes.

6.4. Prepare two rinse plates by adding 200 µL of ultrapure water into columns 1 through 8 and column 12 of two 96-well, 2 corners plates.

6.5. Transfer the lid to the first rinse plate and let it settle for 10 s, to remove excess of stain and planktonic bacteria. Transfer to the second rinse plate and repeat.

6.6. Let the pegged lid air-dry, upside down, for 30 minutes.

6.7. Add 150 µL of 95% ethanol to a new 96-wells, 2 corners plate, in columns 1 through 8, and column 12.

6.8. Once dry, place the pegged lid into the ethanol plate and incubate for 10 minutes.

6.9. Remove the pegged lid and discard it, along with the staining and rinse plates used in this section.

6.10. Transfer 100 µL of each well from the plate in (6.8) into the corresponding well of a fresh 96-wells (ONE CORNER) plate.

6.11. Use a plate reader to determine absorbance at 600 nm.

7. Quantitative determination of the MBEC 7.1. Place the recovery plate with the pegged lid (from step 6.5) in the stainless steel tray, and the tray, in the sonicator. Sonicate on high for 25 to 35 min to remove and disaggregate the biofilm.

7.2. Eight sterile 96-well, ONE CORNER plates are used for this step (columns 1 through 8 only).

7.2.1. Add 180 µL of buffered water to rows B through H in all 8 plates.

7.2.2. Following sonication and using multichannel micropipette, transfer 100 µL from each well of row A of the recovery plate to row A of a sterile plate prepared in 7.2.1.

7.2.3. Transfer 100 µL from each well of row B of the recovery plate to row A of a second sterile plate prepared in 7.2.1.

7.2.4. Repeat for rows C through H of the recovery plate.

7.2.5. Serially dilute with a multichannel pipette ($10^0$ to $10^{-7}$) by transferring 20 µL down each of the 8 rows for each plate.

7.3. Spot plate the dilution series from each of the eight microtiter plates on TSA for viable cell counts. Use one square TSA plate per microtiter plate. Using a multichannel pipette, remove 5 µL from each well and dispense on TSA plate.

7.4. Incubate the TSA plates at 33-37° C. during 18 to 20 h and enumerate colonies.

7.5. Discard the pegged MBEC lid and 96 plates used to create the serial dilutions.

8. Qualitative determination of the MBEC
    8.1. Add 100 μL of sterile TSB to each well of the recovery plate.
    8.2. Cover recovery plate with a new sterile, non-pegged lid and place in a humidified incubator at 33-37° C. for 24 h.
9. Data Analysis
    9.1. Quantitative MBEC results using $Log_{10}$ reduction:
        9.1.1. Count the 5 μL spots on each of the 8 spot plates where individual colonies are visibly distinct from each other within the plated spot. Record the column (1-8) and dilution row ($10^0$ to $10^7$) in which each spot is located.
        9.1.2. Calculate the $log_{10}$ density for each peg as follows:

$$Log_{10} (CFU/mm^2) = Log_{10}[(X/B)(V/A)(D)]$$

where:
        X=CFU counted in the spot,
        B=volume plated (0.01 mL),
        V=well volume (0.20 mL),
        A=peg surface area (46.63 mm2), and
        D=dilution
        9.1.3. Average the counts from columns 1 through 5 spot plated for Row A to determine the mean $log_{10}$ density for the undiluted disinfectant.
        9.1.4. Average the counts from columns 1 through 5 spot plated for Row B to determine the mean $log_{10}$ density for the 50% disinfectant. Repeat calculation for the remaining rows (C-H).
        9.1.5. Average the counts from column 6, Rows A through H to determine the mean $log_{10}$ density for the neutralizer effectiveness control according to the procedure described in TSA Test Method E1054.
        9.1.6. Average the counts from column 7, Rows A through H to determine the mean $log_{10}$ density for the neutralizer toxicity control.
        9.1.7. Average the counts from column 8, Rows A through H determine the mean $log_{10}$ density for the untreated control.
        9.1.8. Calculate the $log_{10}$ reduction for each disinfectant concentration as follows:

Reduction=Mean $Log_{10}$ Untreated Control Pegs–
Mean $Log_{10}$ Treated Pegs 9.2. Qualitative MBEC Results are determined following the 24 h incubation of the recovery plates by visual scoring (+/−growth). To determine the minimum biofilm eradication concentration (MBEC) values, check for turbidity (visually) in the wells of the recovery plate. Alternatively, use a microtiter plate reader to obtain optical density measurements at 650 nm ($OD_{650}$). Clear wells ($OD_{650}$=0.1) are evidence of biofilm eradication. The MBEC is defined as the minimum concentration of disinfectant that eradicates the biofilm. This is the lowest concentration in which there is no growth observed in the majority of the five wells.

Example 2: Biofilm Eradication in a Recirculating Domestic Hot Water System Using a Treatment Solution Mixture of Chlorine and Chlorine Dioxide This example illustrates method for applying a mixture of chlorine and chlorine dioxide to a recirculating domestic hot water system for treatment of biofilms. The physical and chemical parameters in the example, such as the chemical composition of the treatment solution, temperature of the treatment solution, pH of the treatment solution, flow rates, treatment time, and sequence, are for illustration purposes and are not intended to limit the scope of the invention.

A dosing tap is installed at the output side of the building's centralized water heater. A chemical feed pump compatible with the treatment solution is connected to the dosing tap. A sample tap is installed at the hot water return. Fixtures (taps, showerheads) throughout the building are prepared by removing aerators and point-of-use filters. Off-gas prevention devices—e.g., flexible hoses that serve as a conduit from the point where the treatment solution exits the fixture to the drain—are attached to each outlet. Unheated domestic water is circulated through the hot water distribution system at 2-8 feet per second (fps).

Chlorine and chlorine dioxide are applied to the circulating water at the dosing tap such that the resultant composition is a treatment solution with a concentration of 50 mg/L (~25 mg/L each of chlorine and chlorine dioxide) at pH 7.5. Sodium silicate, a complexing agent is applied to the circulating water to achieve a concentration of 25 mg/L. The treatment solution is circulated through the domestic hot water system for one hour. The concentration of the treatment solution is measured at the hot water return every 5 minutes; if the concentration is ≥5% less than the 50 mg/L set point, additional chemicals are applied at the dosing tap until the target concentration of the treatment solution, measured at the hot water return, is achieved.

Progressing through the facility, starting at the dosing point, taps are opened to full flow until the treatment solution concentration reaches the 50 mg/L set point; the flow is then reduced to 0.25 gallons per minute (gpm), and the water is allowed to flow for an additional 5 minutes, then turned off. Owing to the design of the off-gas containment device, the treatment solution remains in contact with all wettable surfaces of the tap.

After all the taps have been flushed with the treatment solution and closed, the treatment solution is circulated through the system for additional 1 hour. The chemical feed pump is turned off, and the hot water system is flushed with clear potable water for 30 minutes.

Starting at the dosing point and progressing through the facility, all taps are opened to full flow and flushed with clean, unheated domestic water until the concentrations of chemicals in the water are below the EPA Maximum Contaminant Level (MCL) and Maximum Disinfectant Residual Level (MRDL) limits, which are the levels to which disinfectants or disinfection by-products are regulated. Clean water is then allowed to flow through the tap for an additional 5 minutes. The concentration of the treatment solution is re-measured and documented to be below the MRDL/MCL for each regulated disinfectant/disinfection by-product. The tap is turned off and the gas-containment device is removed.

After the acute treatment, the domestic hot water system may be treated to provide ongoing microbial control.

All publications, patents, patent applications and other documents cited in this application are hereby incorporated by reference in their entireties for all purposes to the same extent as if each individual publication, patent, patent application or other document were individually indicated to be incorporated by reference for all purposes. Full citations for these references may be found at the end of the specification immediately preceding the claims.

While various specific embodiments have been illustrated and described, it will be appreciated that various changes can be made without departing from the spirit and scope of the invention(s).

REFERENCES

Anand, C. M., Skinner, A. R., Malic, A., & Kurtz, J. B. (1983). Interaction of *L. pneumophilia* and a free living amoeba (*Acanthamoeba palestinensis*). *The Journal of Hygiene*, 91(2), 167-178.

Declerck, P. (2010). Biofilms: the environmental playground of *Legionella*. *Environmental Microbiology*, 12(3), 557-566.

Ceri et al., "The Calgary Biofilm Device: New Technology for Rapid Determination of Antibiotic Susceptibilities of Bacterial Biofilms," *J Clin Microbiol.* 1999 June; 37(6): 1771-1776.

Donlan, R. M., et al. (2005). *Legionella pneumophila* associated with the protozoan *Hartmannella vermiformis* in a model multi-species biofilm has reduced susceptibility to disinfectants. Biofouling, 21(1), 1-7.

Katz, A., et al. (1994) *Disinfection of Effluent by Combinations of Equal Doses of Chlorine Dioxide and Chlorine Added Simultaneously over Varying Contact Times.* Water Research, 28(10): p. 2133-2138.

Kuiper, M. W., et al. (2004). Intracellular proliferation of *Legionella pneumophila* in *Hartmannella vermiformis* in aquatic biofilms grown on plasticized polyvinyl chloride. Applied and Environmental Microbiology, 70(11), 6826-6833.

LeChevallier, et al. (1988) Inactivation of biofilm bacteria. Appl Environ Microbiol. October; 54(10): 2492-2499.

Murga, R., et al. (2001). Role of biofilms in the survival of *Legionella pneumophila* in a model potable-water system. *Microbiology (Reading, England)*, 147 (Pt 11), 3121-3126.

NRC. (2006). *Drinking water distribution systems: assessing and reducing risks*: National Academy Press.

Norgaard, J., "Water Disinfection in Commercial Buildings," archived Mar. 28, 2012, retrieved from internet: <URL: cbs.grundfos.com/CBS_Master/downloads/Download_Files/1011766_Water_disinfection_INT.pdf>; pages 2, 3, 5-7.

Rittmann, D. et al., "Impact of Mixing Chlorine and Chlorine Dioxide on Total Trihalomethane Formation: Part 1," Water & Waste Digest, Jul. 26, 2002, pages 21-23.

Rosenblatt, A. et al. (1994) Methods of treating water using combinations of chlorine dioxide, chlorine and ammonia. U.S. Pat. No. 6,716,354.

Sheehan, K. B., et al. (2005). *Legionella* species diversity in an acidic biofilm community in Yellowstone National Park. [10.1128/AEM.71.1.507-511.2005]. *Applied and Environmental Microbiology*, 71(1), 507-511.

Srinivasan, A., G. et al. (2003) *A 17-month evaluation of a chlorine dioxide water treatment system to control Legionella* species *in a hospital water supply*. Infection Control and Hospital Epidemiology, 24(8): p. 575-579.

Taylor R H et al. (2000). Chlorine, chloramine, chlorine dioxide and ozone susceptibility of *Mycobacterium avium*. Applied and Environmental Microbiology, 66:1702-1705.

Van der Wende, E. and Characklis, W. G. (1990). Biofilms in Potable Water Systems. In: McFeters, G. A., Ed. Drinking Water Microbiology, New York, NY. Springer Verlag.

Walker, J. T. and M. Morales, (1997) *Evaluation of chlorine dioxide (ClO2)for the control of biofilms.* Water Science and Technology. 35(11-12): p. 319-323.

White, G. C., *Handbook of Chlorination and Alternative Disinfectants*, Wiley Interscience (1999).

Williams, M. W., et al. Point-of-Use Membrane Filtration and Hyperchlorination to Prevent Patient Exposure to Rapidly Growing Mycobacteria in the Potable Water Supply of a Skilled nursing Facility. Infect Control Hosp Epidemiol. 2011 September; 32(9):837-44.

Yee, R. B., & Wadowsky, R. M. (1982). Multiplication of *Legionella pneumophila* in unsterilized tap water. *Applied and Environmental Microbiology*, 43(6), 1330-1334.

Yoder, J. S., et al. (2008). Surveillance for Waterborne Disease and Outbreaks Associated with Recreational Water Use and Other Aquatic Facility-Associated Health Events—United States, 2005-2006.

Zhang, Z. (2007) Use of *Legionella* Chlorine Dioxide for *Legionella* Control in Hospital water systems. Ph.D. Thesis, University of Pittsburgh.

What is claimed is:

1. A method for inactivating biofilm-associated pathogens in a building water system, the method comprising contacting interior surfaces of the building water system with a solution comprising a mixture of chlorine and chlorine dioxide in a ratio by weight of from 80:20 to 20:80, each component of the mixture having a concentration of at least 1.5 mg/L and the mixture having a total concentration of up to 200 mg/L.

2. The method of claim 1, wherein the mixture of chlorine and chlorine dioxide is in a ratio by weight of 50:50.

3. The method of claim 1, wherein the concentration of each of chlorine and chlorine dioxide is at least 12.5 mg/L, at least 25 mg/L, or at least 50 mg/L.

4. The method of claim 1, wherein the solution has a temperature of between 20 to 55° C.

5. The method of claim 1, wherein the solution has a pH of about 6.5 to about 9.0.

6. The method of claim 1, wherein the solution has a pH of between 7.2 and 9.0.

7. The method of claim 1, wherein the solution has a pH of >7.5.

8. The method of claim 1, wherein the building water system has a free residual concentration of 0.8 mg/L or less chlorine dioxide and 0.4 mg/L or less chlorine.

9. The method of claim 1, wherein the interior surfaces of the building water system comprise a material selected from the list consisting of copper, brass, iron, galvanized steel, stainless steel, PVC, HDPE, and combinations thereof.

10. The method of claim 1, wherein the building water system is fed by a premise plumbing system.

11. The method of claim 1, wherein the building water system comprises a cooling tower.

12. The method of claim 1, wherein the chlorine and chlorine dioxide components of the mixture are contacted with the building water system separately such that the solution forms in situ.

13. The method of claim 1, wherein the biofilm-associated pathogens comprise a microorganism selected from the group consisting of *Acinetobacter, Elizabethkingia (Flavobacterium), Escherichia coli, Klebsiella, Legionella,* non-tubercular Mycobacteria (NTM), *Pseudomonas, Stenotrophomonas,* protozoa, and combinations thereof.

14. The method of claim 1, wherein the solution further comprises a complexing agent.

15. The method of claim 14 wherein the complexing agent comprises sodium silicate.

16. The method of claim 1, wherein the contacting is carried out under turbulent flow conditions.

17. The method of claim 16, wherein the turbulent flow conditions have a Reynolds value of at least 4,000.

* * * * *